W. BUTTERFIELD.
TIRE FOR THE WHEELS OF AUTOMOBILES AND OTHER VEHICLES.
APPLICATION FILED FEB. 14, 1911.
1,010,230.
Patented Nov. 28, 1911.
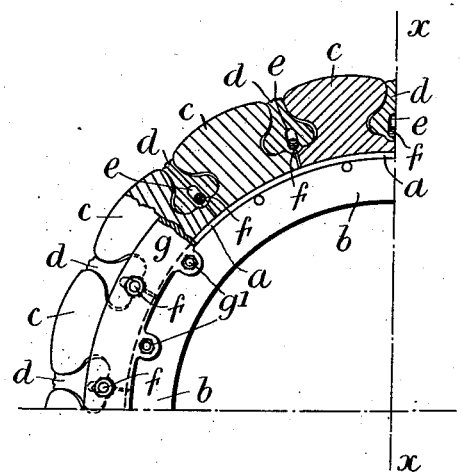
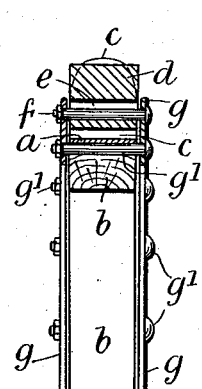
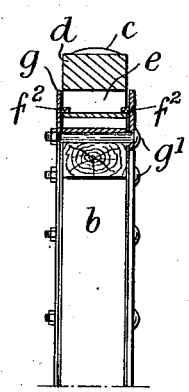
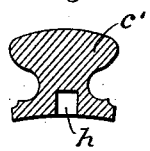

UNITED STATES PATENT OFFICE.

WILLIAM BUTTERFIELD, OF DUBLIN, IRELAND.

TIRE FOR THE WHEELS OF AUTOMOBILES AND OTHER VEHICLES.

1,010,230.  Specification of Letters Patent. Patented Nov. 28, 1911.

Application filed February 14, 1911. Serial No. 608,617.

*To all whom it may concern:*

Be it known that I, WILLIAM BUTTERFIELD, a subject of the King of Great Britain and Ireland, residing at Dublin, Kingdom of Great Britain and Ireland, have invented certain new and useful Improvements in Tires for the Wheels of Automobiles and other Vehicles; and I do hereby declare the following to be a full, clear, and exact description of the invention, such as will enable others skilled in the art to which it appertains to make and use the same.

This invention relates to that class of wheel tire in which a series of separate resilient blocks are arranged around and retained on the wheel rim or felly, and has for its object to provide an improved construction.

Referring to the accompanying drawings, Figure 1 illustrates, partly in elevation and partly in section, the improved tire. Fig. 2 is a section on the line $x, x$, Fig. 1. Fig. 3 is a modification of the holding block. Fig. 4 is a modification of the resilient block, and Fig. 5 is a view similar to Fig. 2 showing a modification of the means for retaining the blocks on the wheel.

Arranged around and bearing at foot on the usual bond or binding rim $a$ of the wheel felly $b$ are bulb-headed flanged blocks $c$ of india-rubber or other suitable resilient substance. The toes or flanges of the resilient blocks $c$ are close together, nearly touching. Spaces intervene between the webs or middle parts of the blocks $c$, and in these spaces are placed blocks or keys $d$, of steel or other suitable metal, which bear on the toes or flanges of the resilient blocks $c$.

Through elongated holes or slots $e$ provided in the holding metal blocks $d$ are passed bolts $f$ which extend also through the flanges or flanking plates $g$ which are of the kind usually employed in motor vehicles of the heavier classes, and are held to the wheel by the bolts $g'$ passed through the felly $b$.

Normally, as shown in the drawing, the tread faces of the resilient blocks $c$ project outward beyond the outer faces of the holding blocks $d$. The outer faces of the blocks $d$ are, in the ordinary running of the wheel, out of contact with the ground, but when skidding or side-slipping action commences, the extra compressing effect thereby occasioned to the resilient blocks $c$ on which the wheel normally runs, compresses the blocks $c$ and brings about contact of the holding blocks $d$ with the ground, arresting side pressure on the resilient blocks $c$ and stopping the skidding or slipping action as well as preventing creeping.

Any resilient block or blocks $c$ can be readily taken out and turned end for end thus enabling wear to be equalized. Similarly with respect to the holding blocks $d$.

Instead of being in one piece each, the blocks $d$ may be divided. The blocks $d'$ may have two bolt holes $e'$, as shown in Fig. 3; two bolts being in such block employed to secure the block in place on the wheel.

The resilient blocks $c'$ may be of hollow section as shown in Fig. 4 at $h$.

At Fig. 5 is shown a modified method of retaining the blocks $d$ on the wheel, by lugs such as $f^2$ formed integrally with the flanges or flanking plates $b$ and projecting into the holes or slots $e$.

What I claim is:—

In a wheel tire, the combination of resilient blocks arranged crosswise on the rim of the wheel, each block having a contracted central portion forming a bulb-shaped head and flanges, a holding block interposed between adjacent resilient blocks, and resting on their flanges; the holding blocks having their outer surfaces within the normal outer surfaces of the bulb-shaped heads, and means for slidably securing the holding blocks to the wheel, substantially as described.

In testimony whereof, I affix my signature in presence of two witnesses.

WILLIAM BUTTERFIELD.

Witnesses:
 W. WHITING,
 D. PLUMMER.

Copies of this patent may be obtained for five cents each, by addressing the "Commissioner of Patents, Washington, D. C."